United States Patent
Chen

[19]

[11] Patent Number: 5,978,389
[45] Date of Patent: Nov. 2, 1999

[54] MULTIPLEX DEVICE FOR MONITORING COMPUTER VIDEO SIGNALS

[75] Inventor: Sun Chung Chen, Taipei, Taiwan

[73] Assignee: Aten International Co., Ltd., Taipei, Taiwan

[21] Appl. No.: 09/038,953

[22] Filed: Mar. 12, 1998

[51] Int. Cl.[6] .................................................. H04J 3/02
[52] U.S. Cl. ............................................................ 370/538
[58] Field of Search ................................... 370/537–540; 348/143–161

[56] References Cited

U.S. PATENT DOCUMENTS

| | | | |
|---|---|---|---|
| 4,015,366 | 4/1977 | Hall, III | 348/143 |
| 4,518,986 | 5/1985 | Hinn et al. | 348/190 |
| 4,803,464 | 2/1989 | Holmes et al. | |
| 5,864,561 | 1/1999 | Becher | 370/537 |

*Primary Examiner*—Chau Nguyen
*Assistant Examiner*—Fred Wolkow
*Attorney, Agent, or Firm*—McDermott, Will & Emery

[57] ABSTRACT

A multiplex device is provided for monitoring computer video signals and receives as input the video signals of a plurality of computers. The multiplex device selects the video signals of one of the plurality of computers to be inputted into a monitor for monitoring. The multiplex device for monitoring the computer video signals has three sets of switch circuits, a control signal generating circuit, three sets of voltage amplifying circuits, three sets of current amplifying circuits, a synchronous signal multiplex selecting circuit, and an interface circuit.

7 Claims, 6 Drawing Sheets

MULTIPLEX DEVICE FOR MONITORING COMPUTER VIDEO SIGNALS

FIELD OF THE INVENTION

The present invention relates to a device for monitoring video signals of a plurality of computers, and more particularly to a multiplex device for monitoring computer video signals by multiplex selecting the video signals of one of the computers to be inputted into a monitor for monitoring.

BACKGROUND OF THE INVENTION

It is a known method to monitor an operation or a manufacturing process by means of a plurality of computers and a plurality of monitors. Take an example, in an automatic manufacturing process, it is usually provided with a plurality of computers and a plurality of monitors at some monitoring points, and then collecting the video signals outputted from said monitors by a management computer, so that a supervisor can monitor and control the whole manufacturing process.

The disadvantage of the above known method can be described in FIG. 1. As shown in FIG. 1, the circuit diagram of a known device for monitoring video signals of a plurality of computers is indicated by the symbol 10, wherein four sets of red, green, and blue video signals of four computer terminals, i.e. (Ra, Ga, Ba), (Rb, Gb, Bb), (Rc, Gc, Bc), (Rd, Gd, Bd), are shown. The red video signals Ra, Rb, Rc, Rd are inputted into a first set of relays 11, the green video signals Ga, Gb, Gc, Gd are inputted into a second set of relays 12, and the blue video signals Ba, Bb, Bc, Bd are inputted into a third set of relays 13.

If the supervisor will monitor video signals of the second computer terminal, he can input two video selecting signals S11, S12 to a decoder 16 for generating four control signals Ca, Cb, Cc, Cd, wherein only Cb can make the corresponding relay in each set to be conducting, while other signals Ca, Cc, Cd will make other relays in each set open, thus the video signals Rb, Gb, Bb of the second computer terminal will pass through the corresponding relays and to be inputted into a connector 14. Additionally, said two video selecting signals S11, S12 are also inputted into a multiplexor 17 (which are inputted with the four sets of vertical and horizontal synchronous signals (Va, Ha), (Vb, Hb), (Vc, Hc), (Vd, Hd) of the four computer terminals) for selecting the vertical and horizontal synchronous signals Vb, Hb of the second computer terminal, and being inputted into the connector 14. The connector 14 will then send the video signals Rb, Gb, Bb and the horizontal and vertical sync signals Vb, Hb to a monitor 15 for being monitored by the supervisor.

The disadvantage of the above known method is in that the three sets of relays are analog mechanical devices, and there is no circuit for signal compensation, so the inputted video signals will be seriously attenuated when the distance is long or the frequency is high. Therefore, the distance between the monitor 15 and the four computer terminals are limited, and the frequency bandwidth of the video signals are also limited.

In order to improve the disadvantage of the circuit in FIG. 1, another three sets of analog IC switches 21, 22, 23 (as shown in FIG. 2) comprising transistor pairs (i.e. NPN transistor interconnected with PNP transistor, or PMOS transistor interconnected with NMOS transistor) are used to replace the three sets of relays 11, 12, 13 in FIG. 1 for being inputted with AC type of video signals, and an operational amplifier IC 24 (comprising three sets of operational amplifier 241, 242, 243) are added before the connector 25 to amplify the selected video signals for compensation.

In FIG. 2, four sets of red, green, and blue video signals of four computer terminals, i.e. (Ra, Ga, Ba), (Rb, Gb, Bb), (Rc, Gc, Bc), (Rd, Gd, Bd), are shown. The red video signals Ra, Rb, Rc, Rd are inputted into a first set of transistor pair analog IC switch 21, the green video signals Ga, Gb, Gc, Gd are inputted into a second set of transistor pair analog IC switch 22, and the blue video signals Ba, Bb, Bc, Bd are inputted into a third set of transistor pair analog IC switch 23.

If the supervisor will monitor video signals of the second computer terminal, he can input two video selecting signals S21, S22 to a decoder 27 for generating four control signals Ca, Cb, Cc, Cd, wherein only Cb can make the corresponding transistor pair in each set to be conducting, while other signals Ca, Cc, Cd will make other transistor pairs in each set open, thus the video signals Rb, Gb, Bb of the second computer terminal will pass through the corresponding transistor pairs and being amplified by the first, the second, and the third video operational amplifiers 241, 242, 243 to be inputted into a connector 25.

Additionally, said two video selecting signals S21, S22 are also inputted into a multiplexor 28 (which are inputted with the four sets of vertical and horizontal synchronous signals (Va, Ha), (Vb, Hb), (Vc, Hc), (Vd, Hd) of the four computer terminals) for selecting the vertical and horizontal synchronous signals Vb, Hb of the second computer terminal, and being inputted into the connector 25. The connector 25 will then send the video signals Rb, Gb, Bb and the horizontal and vertical sync signals Vb, Hb to a monitor 26 for being monitored by the supervisor.

The disadvantage of the circuit in FIG. 2 is in that the transistor pair analog IC switches 21, 22, 23 will make the circuit design more complicated and more expensive. Additionally, since the switches 21, 22, 23 and the operational amplifiers 241, 242, 243 are IC packaged, the frequency bandwidth are therefore limited, video signals higher than 100 MHz will be attenuated abruptly, this limitation apparently makes the circuit in FIG. 2 unadaptable to high frequency video signals currently used. If we try to use high frequency IC switches and operational amplifiers, the cost will be raised dramatically. Furthermore, the video operational amplifiers 241, 242, 243 need a negative voltage besides a positive voltage, so the circuit are complicated and will increase more noises.

OBJECTS OF THE INVENTION

It is therefore an object of the present invention to provide a multiplex device for monitoring computer video signals of high frequency.

It is another object of the present invention to provide a multiplex device for monitoring computer video signals, which is not expensive and can be easily designed.

It is a further object of the present invention to provide a multiplex device for monitoring computer video signals, which can adjust the input and output impedances and the amplifying gain flexibly according to different monitoring distances in order to avoid the unnecessary signal attenuation.

BRIEF DESCRIPTION OF THE DRAWINGS

The present invention can be better understood by detailed description of the following drawings, in which.

DETAILED DESCRIPTION OF THE INVENTION

Figure 1:
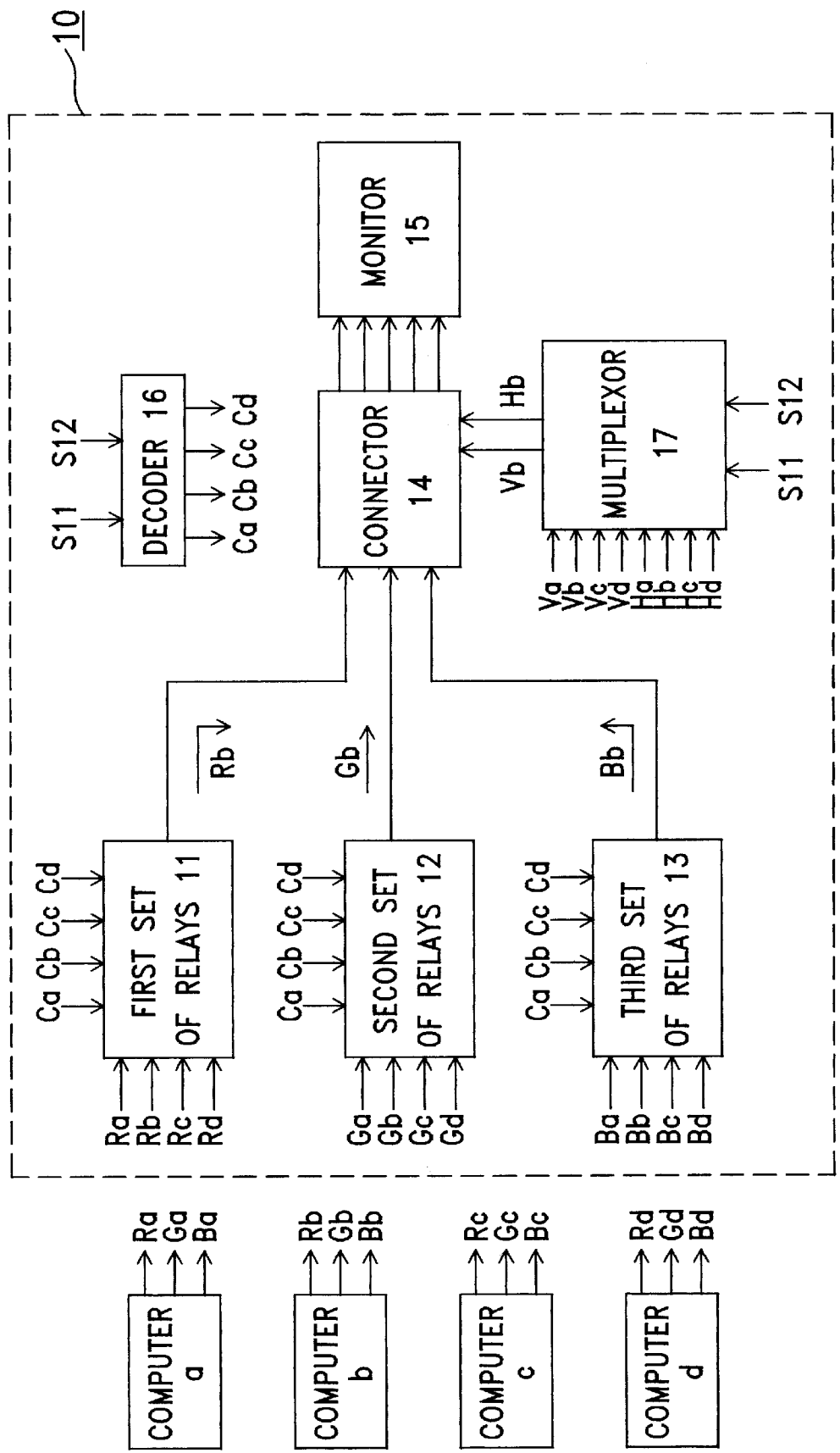
FIG. 1 is a schematic circuit block diagram showing the conventional device for monitoring video signals of a plurality of computers.
Figure 2:
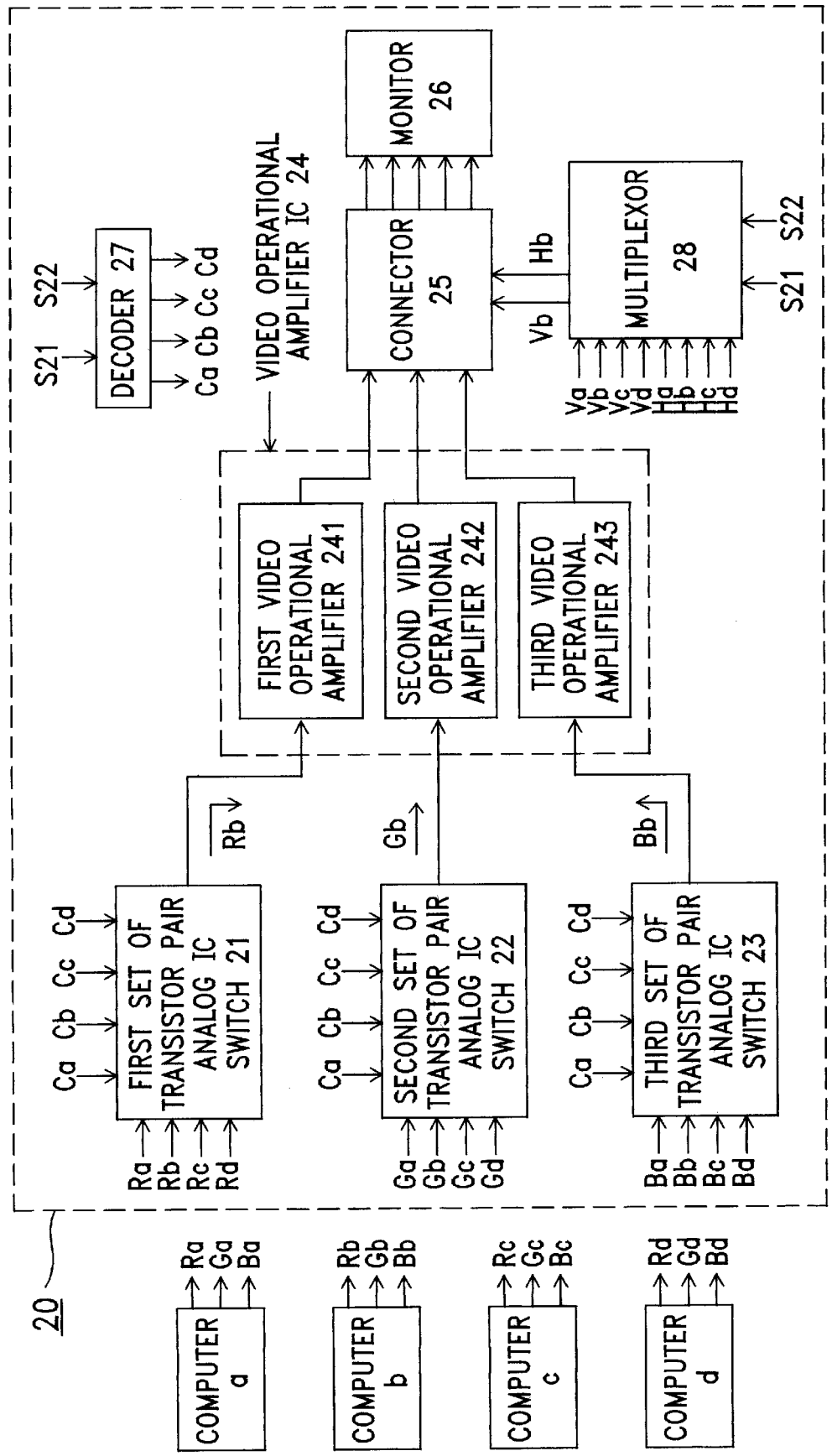
FIG. 2 is a schematic circuit block diagram showing another conventional device for monitoring video signals of a plurality of computers.
Figure 3:
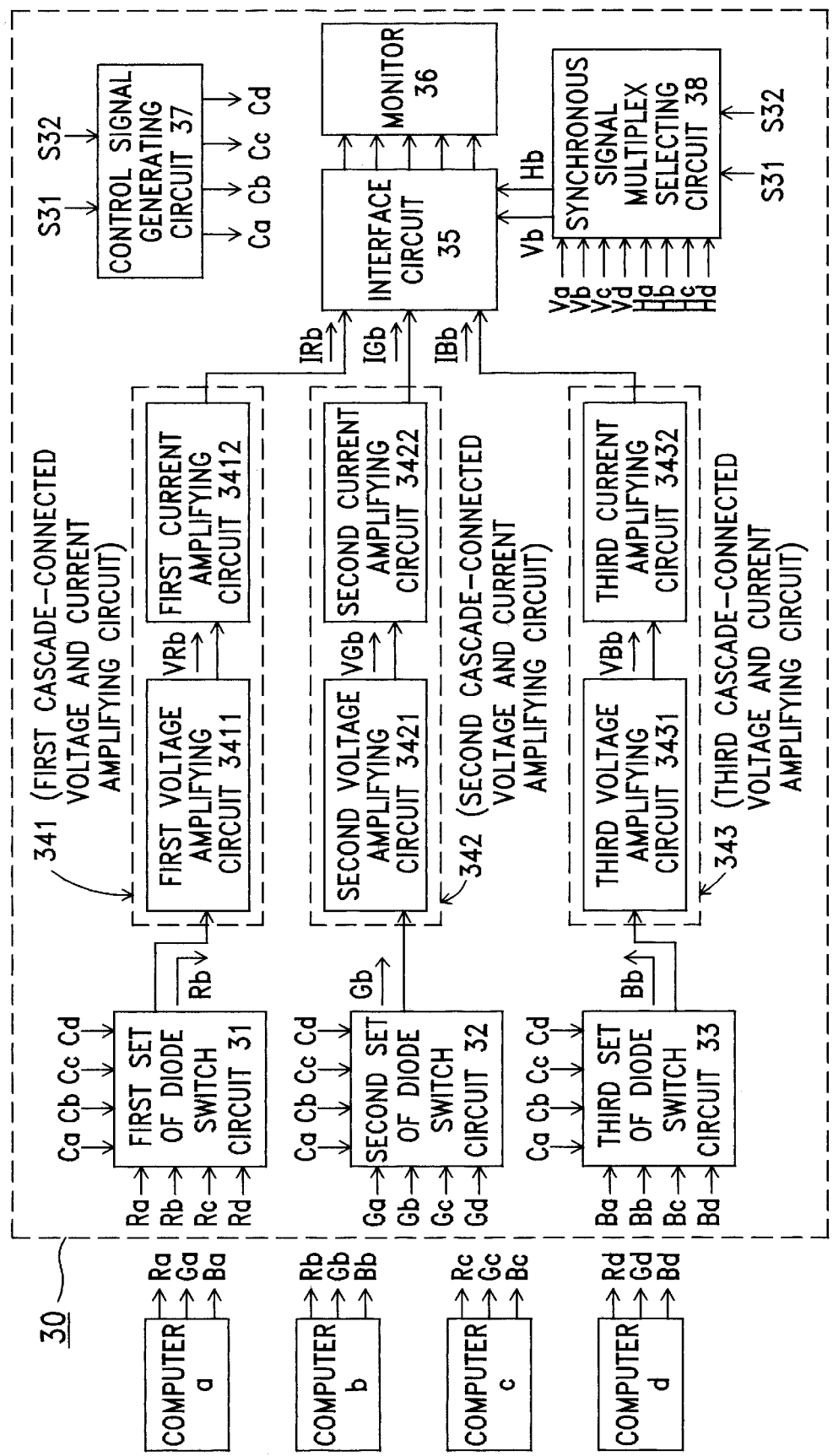
FIG. 3 is a schematic circuit block diagram showing a preferred embodiment of the present invention.

As shown in FIG. 3, the present invention provides a first, a second, and a third set of diode switch circuits 31, 32, 33, each is cascade-connected with a voltage-amplifying transistor circuit and a current-amplifying transistor circuit (i.e. the first, second, and third cascade-connected voltage and current amplifying circuits 341, 342, 343) for being a multiplex device of amplifying and monitoring computer video signals in order to avoid the aforementioned disadvantages of conventional methods.

Please refer to FIG. 3, which is a schematic circuit block diagram 30 showing a preferred embodiment of the present invention, wherein four sets of red, green, and blue video signals of four computer terminals, i.e. (Ra, Ga, Ba), (Rb, Gb, Bb), (Rc, Gc, Bc), (Rd, Gd, Bd), are shown. The red video signals Ra, Rb, Rc, Rd are inputted into a first set of diode switch circuit 31, the green video signals Ga, Gb, Gc, Gd are inputted into a second set of diode switch circuit 32, and the blue video signals Ba, Bb, Bc, Bd are inputted into a third set of diode switch circuit 33.

If the supervisor will monitor video signals of the second computer terminal, he can input two video selecting signals S31, S32 to a control signal generating circuit 37(a decoder is preferred) for generating four control signals Ca, Cb, Cc, Cd, wherein only Cb can make the corresponding diode in each set to be conducting, while other signals Ca, Cc, Cd will make other diodes in each set open, thus the video signals Rb, Gb, Bb of the second computer terminal will pass through the corresponding diodes and to be inputted respectively into a first, a second, and a third voltage amplifying circuits 3411, 3421, 3431, and outputs respectively a red, a green, and a blue video voltage amplifying signals VRb, VGb, VBb to a first, a second, and a third current amplifying circuits 3412, 3422, 3432, and generates respectively a red, a green, and a blue video currrent amplifying signals IRb, IGb, IBb to be outputted into an interface circuit 35.

Additionally, said two video selecting signals S31, S32 are also inputted into a synchronous signal multiplex selecting circuit 38 (which are inputted with the four sets of vertical and horizontal synchronous signals (Va, Ha), (Vb, Hb), (Vc, Hc), (Vd, Hd) of the four computer terminals) for selecting the vertical and horizontal synchronous signals Vb, Hb of the second computer terminal, and being inputted into the interface circuit 35. The interface circuit 35 will then send the signals IRb, IGb, IBb and the horizontal and vertical sync signals Vb, Hb to a monitor 36 for being monitored by the supervisor.

Since the present invention uses diodes as the switch circuit, making the circuit not so complicated, and the voltage amplifying circuit can provide the diodes with a suitable DC bias for conducting, an input path is therefore provided through the diodes for video signals. And also because the present invention need no IC devices, the frequency bandwidth of the video signals are not limited. The present invention can select suitable transistors of high frequency, which are not so expensive as the conventional video signal amplifying IC of high frequency. Besides, only one positive power supply voltage has to be provided, so the circuit is not so complicated and will not generate too much noises.

Figure 4A:
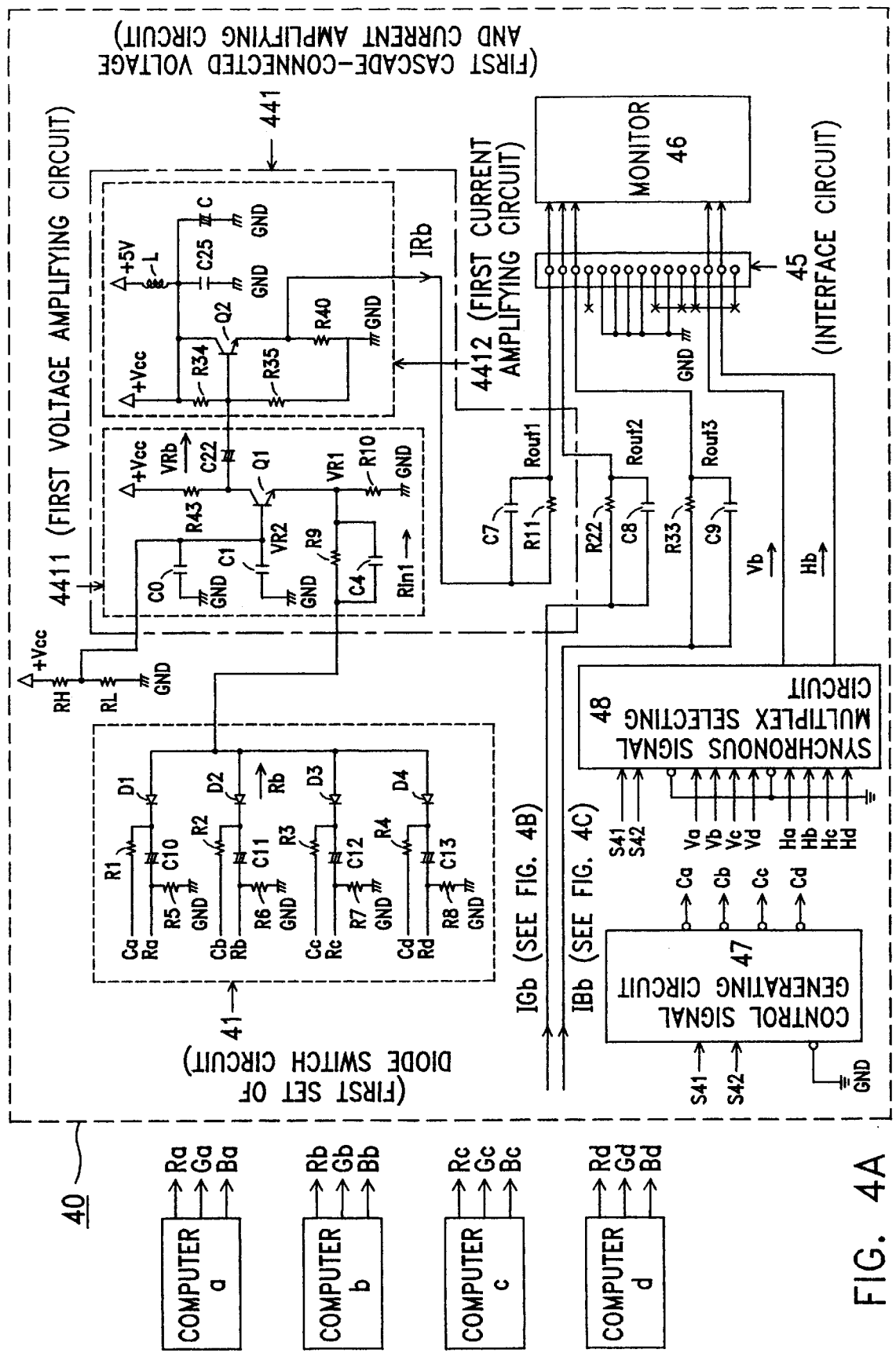
FIG. 4A, FIG. 4B, and FIG. 4C are detailed circuit diagrams of the preferred embodiment of the present invention.
Figure 4B:
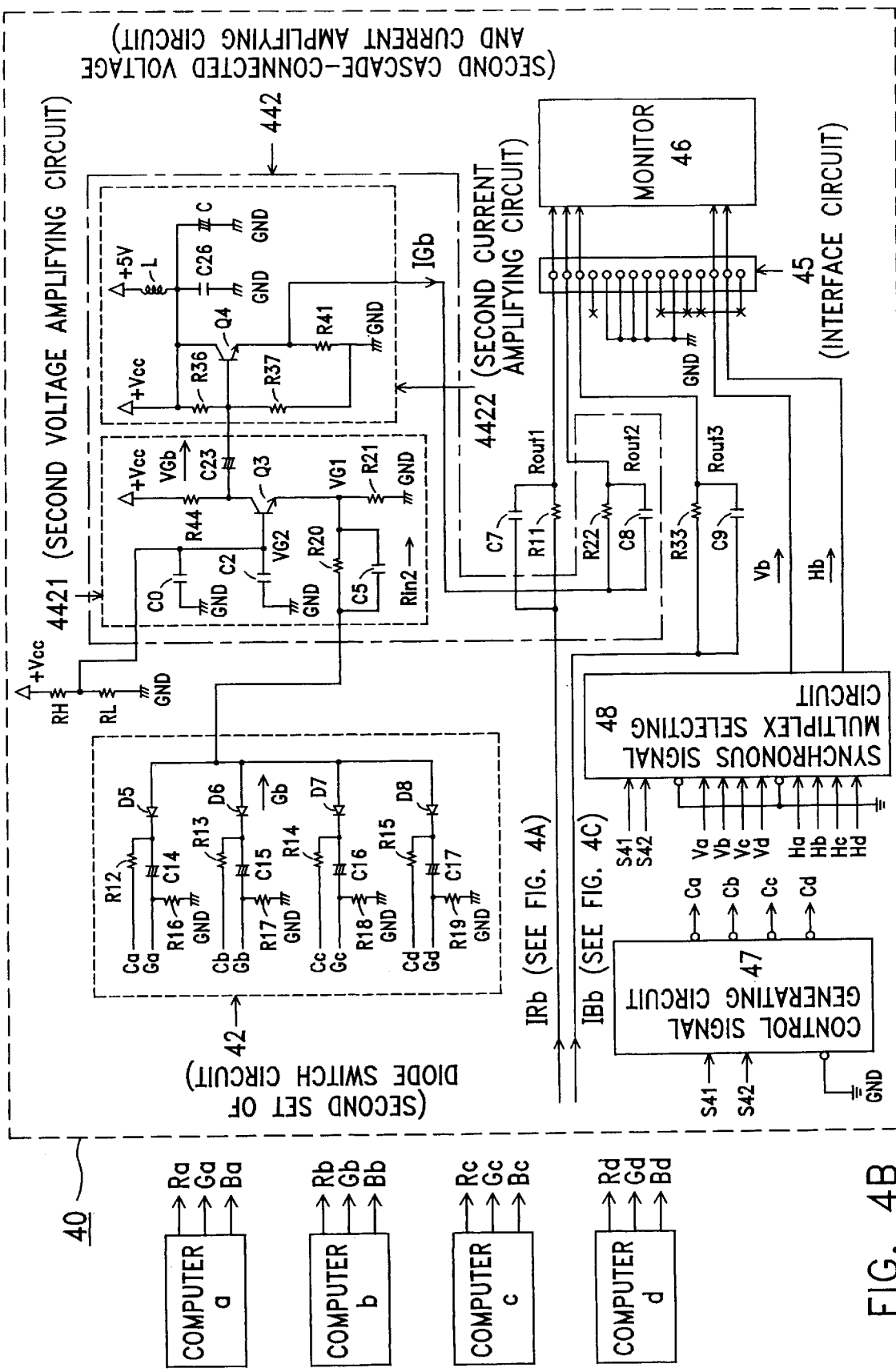
Figure 4C:
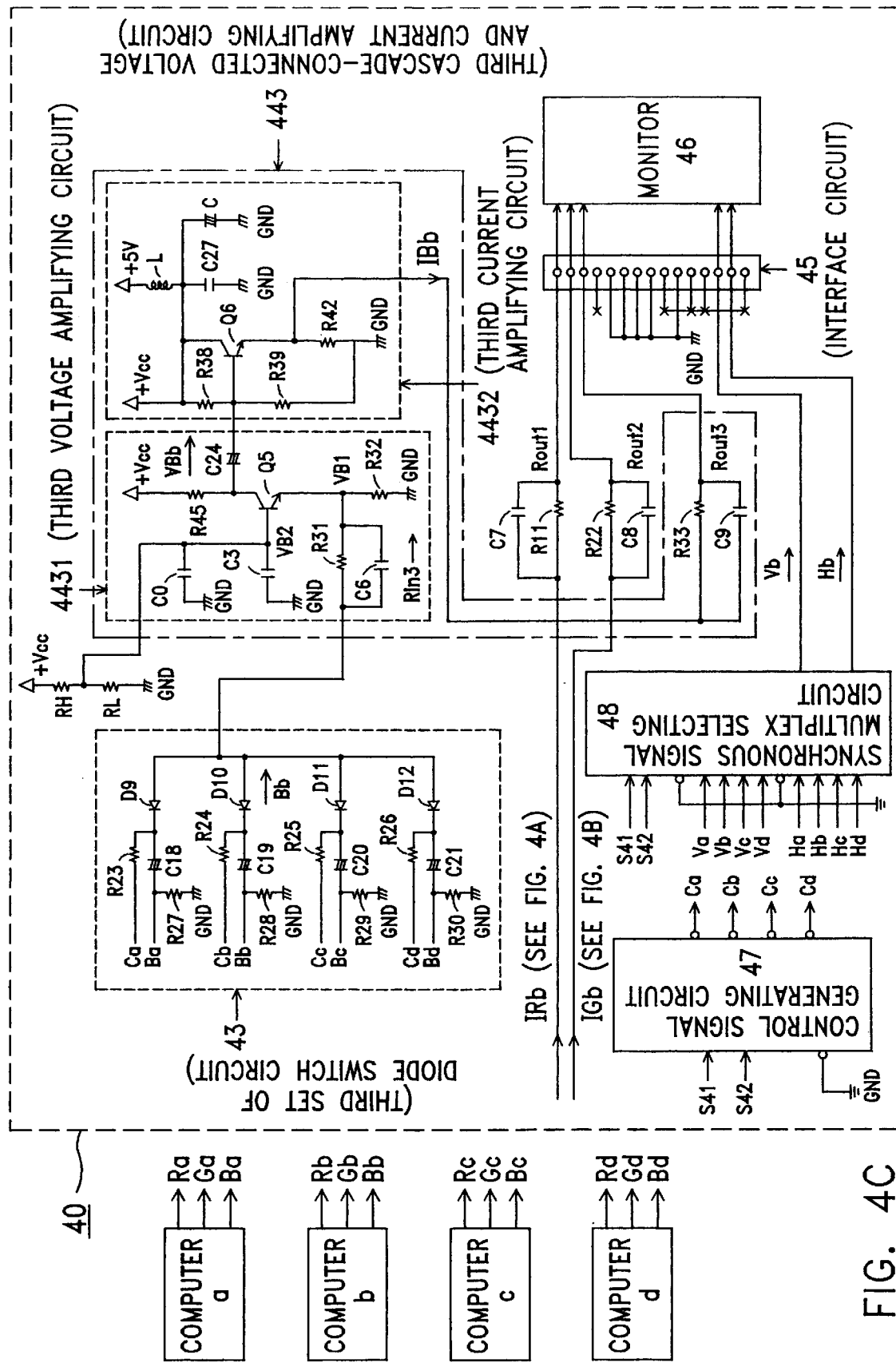

In order to further disclose the spirit of the present invention, a preferred circuit embodiment 40 in FIG. 4A, FIG. 4B, and FIG. 4C is used to further describe the block diagram in FIG. 3, wherein four sets of red, green, and blue video signals of four computer terminals, i.e. (Ra, Ga, Ba), (Rb, Gb, Bb), (Rc, Gc, Bc), (Rd, Gd, Bd), are shown. The red video signals Ra, Rb, Rc, Rd are inputted into a first set of diode switch circuit 41 (see FIG. 4A), the green video signals Ga, Gb, Gc, Gd are inputted into a second set of diode switch circuit 42 (see FIG. 4B), and the blue video signals Ba, Bb, Bc, Bd are inputted into a third set of diode switch circuit 43 (see FIG. 4C). Since the functions and operation modes of the interface circuit 45, the monitor 46, the control signal generating circuit 47 (a decoder is preferred), and the synchronous signal multiplex selecting circuit 48 are similar to those of the interface circuit 35, the monitor 36, the control signal generating circuit 37, and the synchronous signal multiplex selecting circuit 38, they will not be described again. Before the detailed description of the circuits in FIG. 4A, FIG. 4B, and FIG. 4C, since there comprise in FIG. 4A, FIG. 4B, and FIG. 4C three sets of a first, a second, and a third diode switch circuits 41, 42, 43 (each includes four diodes) of similar structure and function, and three sets of a first, a second, and a third cascade-connected voltage and current amplifying circuits 441, 442, 443 (each includes a common base voltage amplifier and a common collector current amplifier) of similar structure and function, only the first set of diode switch circuit 41 and the first cascade-connected voltage and current amplifying circuit 441 in FIG. 4A are described.

If the supervisor will monitor video signals of the second computer terminal, he can input two video selecting signals S41, S42 (e.g. digital signals 0 or 1) to a control signal generating circuit 47 for generating four control signals Ca, Cb, Cc, Cd, wherein only Cb (0 volt) can make the corresponding diode D2 to be conducting, while other signals Ca, Cc, Cd (+5 volt) will make the corresponding diodes D1, D3, D4 open, thus the red video signal Rb of the second computer terminal will pass through the first set of diode switch circuit 41, while red video signals Ra, Rc, Rd of other computer terminals can not pass through the first set of diode switch circuit 41.

The power supply voltage Vcc is divided by resistors RH, RL to cause a DC level VR2 (e.g. 2.5 volt) to be formed at the base of transistor Q1, VR2 is subtracted by a barrier voltage 0.7 volt between the base and the emitter of transistor Q1, so the DC level VR1 of the emitter of transistor Q1 is 1.8 volt. Since the control signal Cb is 0 volt, the diode D2 will definitely be maintained at a conducting state. Other diodes D1, D3, D4 will be maintained at an open state, because related control signals Ca, Cc, Cd are 5 volt. C10, C11, C12, C13 are used to couple related AC signals.

After the diode D2 is conducted, the red video signal Rb can pass through the first set of diode switch circuit 41. Resistors R2, R6 and the AC input impedance Rin1 of the first voltage amplifying circuit 4411(comprising transistor Q1) are parallel connected, the combined AC input impedance of the parallel connected structure can be designed to be impedance matched with the transmission line of the red video signal Rb (e.g. both are 75 ohm) to achieve the best transmission of the video signal. Furthermore, each of the resistors R5~R8 has a DC low impedance for input impedance matching, and can be used in some cases as a device for distinguishing whether each output of said four sets of computer terminals is a mono or color video signal. The DC impedance of said four resistors R5~R8 is lower than 1K ohm.

The resistors R9, R10 and Capacitor C4 in the first voltage amplifying circuit 4411 will provide a DC bias to diodes D1, D2, D3, D4, and can avoid the high frequency attenuation of the red video signal Rb, since high frequency video signal will make capacitor C4 short. Furthermore, multi-layer capacitor C1 at the base of transistor Q1 and the capacitor C0 are used for maintaining said base a low AC impedance, and maintaining VR2 as an ideal voltage source, so as to fulfill the requirement of a common base voltage amplifier and maintain the high frequency response of the red video signal Rb. Resistor R43 is used to set up the collector voltage of Q1.

The first voltage amplifying circuit 4411 will output a red video voltage amplifying signal VRb through a capacitor C22 (for coupling AC signal) to the first current amplifying circuit 4412. The first current amplifying circuit 4412 comprising a transistor Q2 will perform a current amplifying action and output a red video current amplifying signal IRb. Current amplifying circuit 4412 is basically a common collector circuit, wherein R34 and R35 are used to set up a DC bias voltage at the base of Q2, and R40 is used to set up the emitter DC voltage of Q2, capacitors C25 and C are used to stabilize the DC voltage Vcc, the inductor L connected at the 5 volt power supply can prevent EMI phenomena from being produced. The voltage level (e.g. 1.2 volt) at the base of transistor Q2 formed by resistors R34, R35 will maintain the emitter of Q2 at a DC voltage level of 0.5 volt when there is no AC signal, thus to make sure that Q2 will stay in an operating state, and that the red video voltage amplifying signal VRb will not be attenuated by the barrier voltage 0.7 volt between base and emitter of Q2, and that the output DC voltage will be controlled at a very low level.

Furthermore, the AC output impedance Rout1 of the first current amplifying circuit 4412 can also be designed to be impedance matched with the transmission line of the red video signal Rb (e.g. both are 75 ohm), so as to guarantee the best transmission efficiency of the video signal. Capacitor C7 and resistor R11 has a high frequency compensation function to lower the attenuation of the red video current amplifying signal IRb.

Having performed the current amplifying function, the red video current amplifying signal IRb will be outputted to the interface circuit 45, while green and blue video signals Gb, Bb will respectively pass through the diodes D6, D10 in the second and the third diode switch circuits 42, 43, then pass through the second and the third voltage amplifying circuit 4421,4431 and the second and third current amplifying circuit 4422,4432, to produce respectively the green and blue video voltage amplifying signals VGb, VBb and the green and blue video current amplifying signal IGb, IBb, wherein the green and blue video current amplifying signals IGb, IBb will be outputted to the interface circuit 45, and then sent to the monitor 46 just as the red video current amplifying signal IRb does.

Additionally, said two video selecting signals S41, S42 are also inputted into a synchronous signal multiplex selecting circuit 48 (which are inputted with the four sets of vertical and horizontal synchronous signals (Va, Ha), (Vb, Hb), (Vc, Hc), (Vd, Hd) of the four computer terminals) for selecting the vertical and horizontal synchronous signals Vb, Hb of the second computer terminal, and being inputted into the interface circuit 45. The interface circuit 45 will then send the signals IRb, IGb, IBb and the horizontal and vertical sync signals Vb, Hb to a monitor 46 for being monitored by the supervisor.

The inductor L connected at the 5 volt power supply can prevent EMI phenomena from being produced.

If the distances among the multiplex device for monitoring computer video signals 40 and a plurality of computers and the monitor 46 have to be changed, the voltage gain and current gain of the first, the second, the third voltage and current cascade-connected amplifying circuit 441, 442, 443 can be easily redesigned to avoid transmission attenuation of the video signals. If a set of high frequency video signals are monitored, we can easily select suitable transistors Q1~Q6 with high frequency response to avoid attenuation or distortion of the video signals.

To sum up, the frequency of the video signals employed in the present invention can be as high as 250 MHz, and the total cost of the circuit arrangement is much lower than prior art. The input impedance, output impedance, voltage gain, and current gain can be adjusted flexibly according to different monitoring distances so as to avoid unnecessary attenuation of the video signals.

It is no doubt that after reading the above descriptions any skillful person in the art can create many different variations without departing the spirit and scope of the accompanying claims. Therefore, it is intended that the appended claims will cover all those variations.

I claim:

1. A multiplex device for monitoring computer video signals, said device can be inputted with video signals of a plurality of computers, and select a set of video signals of one of said plurality of computers to be inputted into a monitor for monitoring, said device comprising:

three sets of switch circuit for receiving red, green, blue video signals of said plurality of computers respectively, each set of switch circuit including a plurality of diode circuits, the number of said plurality of diode circuits in each set of switch circuit being no less than the number of said plurality of computers, each diode circuit being inputted with one of said related video signals and providing an input impedance matching, all outputs of said plurality of diode circuits in said each set of switch circuit being connected together to form an output of said each set of switch circuit;

a control signal generating circuit having a video selecting signal as an input, and generating a plurality of control signals, the number of said plurality of control signals being no less than the number of said plurality of computers, each of said plurality of control signals being used for controlling each corresponding diode circuit in said three sets of switch circuit, each time when a video selecting signal being inputted, only a corresponding control signal causing each corresponding diode circuit in said three sets of switch circuit to be conducted, while other video selecting signals causing other diode circuits to open;

three sets of voltage amplifying circuit having each input connected with each output of said three sets of switch circuit respectively for providing DC bias to each diode circuit in said three sets of switch circuit, and for amplifying a set of selected video signals respectively, wherein each voltage amplifying circuit providing an input impedance matching with each set of switch circuit respectively, and being a common base voltage amplifying circuit;

three sets of current amplifying circuit having each input connected with each output of said three sets of voltage amplifying circuit for current amplifying each output of said three sets of voltage amplifying circuit respectively, and providing an output impedance matching, wherein each current amplifying circuit being a common collector current amplifying circuit;

a synchronous signal multiplex selecting circuit for receiving a plurality sets of synchronous signal of said plurality of computers, and selecting by means of said video selecting signal a corresponding set of synchronous signal as an output; and an interface circuit being connected with said outputs of said three sets of current amplifying circuit and said synchronous signal multiplex selecting circuit respectively for outputting said outputs to said monitor, so as to achieve the purpose of monitoring one set of video signals of said plurality of computers.

2. The multiplex device for monitoring computer video signals according to claim 1, wherein each diode circuit in said three sets of switch circuit comprising a resistor of DC low impedance for distinguishing whether said plurality of computers being a mono or a color terminal.

3. The multiplex device for monitoring computer video signals according to claim 1, wherein said control signal generating circuit is a decoder.

4. The multiplex device for monitoring computer video signals according to claim 1, wherein said common base voltage amplifying circuit comprising a transistor, a resistor bias circuit being connected with the emitter of said transistor for providing a DC bias to each diode in said three sets of switch circuit.

5. The multiplex device for monitoring computer video signals according to claim 4, wherein a multi-layer capacitor being connected with the base of said transistor for maintaining high frequency response of said device.

6. The multiplex device for monitoring computer video signals according to claim 1, wherein said synchronous signal comprising a horizontal and a vertical synchronous signals.

7. The multiplex device for monitoring computer video signals according to claim 1, wherein said inputted computer video signals can be as high as 250 MHz.

* * * * *